United States Patent
Pai et al.

(10) Patent No.: US 7,116,013 B2
(45) Date of Patent: Oct. 3, 2006

(54) ELECTRONIC POWER SOURCE VOLTAGE REGULATOR WITH UPS FUNCTION

(75) Inventors: Fu-Sheng Pai, Taipei (TW);
Ming-Tsung Tsai, Taipei (TW);
Wen-Yin Tsai, Taipei (TW)

(73) Assignee: Delta Electronics, Inc., (TW)

( * ) Notice: Subject to any disclaimer, the term of this patent is extended or adjusted under 35 U.S.C. 154(b) by 438 days.

(21) Appl. No.: 10/664,626

(22) Filed: Sep. 19, 2003

(65) Prior Publication Data

US 2004/0058590 A1    Mar. 25, 2004

(30) Foreign Application Priority Data

Sep. 20, 2002    (TW) .............................. 91121676 A

(51) Int. Cl.
*H02J 9/00*    (2006.01)
*H02J 3/32*    (2006.01)

(52) U.S. Cl. ..................... 307/64; 307/66; 307/85; 307/86

(58) Field of Classification Search .............. 307/86, 307/64, 66, 85
See application file for complete search history.

(56) References Cited

U.S. PATENT DOCUMENTS

| 4,935,861 | A  | * | 6/1990  | Johnson et al.  | 363/132 |
| 6,181,029 | B1 | * | 1/2001  | Berglund et al. | 307/66  |
| 6,671,191 | B1 | * | 12/2003 | Hanaoka et al.  | 363/37  |

* cited by examiner

*Primary Examiner*—Brian Sircus
*Assistant Examiner*—Dru Parries
(74) *Attorney, Agent, or Firm*—Sutherland Asbill & Brennan LLP

(57) ABSTRACT

An electronic AC power source voltage regulator with the UPS function is provided. The proposed electronic power source voltage regulator includes: an input port, an output, a switch set electrically connected between the input port and an AC power source, a capacitor, an inductor, and an electrical energy converter including an electrical energy storage device, a first output terminal, and a second output terminal. The electrical energy converter of the proposed electronic power source voltage regulator transfers an electrical energy of the electrical energy storage device into the output voltage to be output so as to stabilize the output voltage when a significant voltage difference of the AC power source occurs.

10 Claims, 8 Drawing Sheets

($V_S$ : 50V/div, 5ms/div ; $V_L$ : 50V/div, 5ms/div)

($V_S$ : 50V/div, 5ms/div ; $V_L$ : 50V/div, 5ms/div)

( $V_S$ : 50V/div , 5ms/div ; $V_L$ : 50V/div , 5ms/div )

( $V_S$ : 50V/div, 25ms/div ; $V_L$ : 50V/div, 25ms/div )

( $V_S$ : 50V/div, 25ms/div ; $V_L$ : 50V/div, 25ms/div )

ELECTRONIC POWER SOURCE VOLTAGE REGULATOR WITH UPS FUNCTION

FIELD OF THE INVENTION

The present invention relates to a power source voltage regulator, and more particularly to an electronic power source voltage regulator with the uninterruptible power supply (UPS) function.

BACKGROUND OF THE INVENTION

Please refer to FIG. 1(a), it shows the block diagram of the isolated mechanical power source voltage regulator of the prior art. The isolated mechanical power source voltage regulator 1 includes an isolated transformer 11, a relay switch 12, and an input voltage detecting circuit 13 as shown in FIG. 1(a). The input voltage detecting circuit 13 is employed by the isolated mechanical power source voltage regulator 1 to detect an input voltage. According to the value of the input voltage, a trigger signal is sent out by the input voltage detecting circuit 13 to start the relay switch 12. The relay switch 12 is employed to change the turn ratio of the isolated transformer 11 so as to provide a stable output voltage.

Please refer to FIG. 1(b), it shows the block diagram of the non-isolated mechanical power source voltage regulator of the prior art. The non-isolated mechanical power source voltage regulator 2 includes a self-coupled transformer with multiple-outputs 21, a relay switch 22, and an input voltage detecting circuit 23 as shown in FIG. 1(b). The input voltage detecting circuit 23 is also employed by the non-isolated mechanical power source voltage regulator 2 to detect an input voltage. According to the value of the input voltage, a trigger signal is sent out by the input voltage detecting circuit 23 to start the relay switch 22. The relay switch 22 is employed to change the turn ratio of the self-coupled transformer with multiple-outputs 21 so as to provide a stable output voltage.

According to the above descriptions, changing the turn ratios of the transformers are employed to stabilize the voltage by both of the mechanical power source voltage regulators 1 and 2. Therefore, this kind of power source voltage regulators have the following disadvantages:

(a) The system responses of the mechanical power source voltage regulators are relatively slow and the output voltage modulating rates are relatively high;
(b) Since a transformer with a relatively huge volume is needed by each of those mechanical power source regulators, the power densities of those power source voltage regulators are relatively low; and
(c) The voltage values at the primary windings of the transformers of those mechanical power source voltage regulators are at the commercial power levels no matter they are isolated or non-isolated.

Please refer to FIG. 2(a), it shows the schematic circuit diagram of the first electronic power source voltage regulator of the prior art. The first electronic power source voltage regulator 3 is an electronic circuit including at least one electronic switch 31, at least one resistor 32, at least one capacitor 33, and at least one inductor 34 as shown in FIG. 2(a). The high frequency electronic switching techniques are employed to provide a stabilized voltage.

Please refer to FIG. 2(b), it shows the schematic circuit diagram of the second electronic power source voltage regulator. The second electronic power source voltage regulator 4 is an electronic circuit including at least one electronic switch 41, at least one resistor 42, at least one capacitor 43, and at least one inductor 44 as shown in FIG. 2(b). The high frequency electronic switching techniques are employed to provide a stabilized voltage.

The above-mentioned electronic power source voltage regulators have the following disadvantages:

(a) The phases of output/input voltages of those electronic power source voltage regulators have the phase shift, and the phase shift is related to the status of the current on the load of the apparatus, thus the bypass route between the input and the output terminals of those electronic power source voltage regulators can not be designed so as to result in the decreasing of the reliability of the system;

There is no DC-link connecting route in any of the above-mentioned electronic power source voltage regulators, thus a battery can not be added inside such a regulator so as to provide a redundant power source when the commercial power has a significant voltage difference.

Keep the drawbacks of the prior arts in mind, and employ experiments and research full-heartily and persistently, the electronic power source voltage regulator with the UPS function is finally conceived by the applicants.

SUMMARY OF THE INVENTION

It is therefore an object of the present invention to provide an electronic AC power source voltage regulator with the UPS function to transfer an electrical energy of an electrical energy storage device into the output voltage to be output so as to stabilize the output voltage when a significant voltage difference of the AC power source occurs.

According to the aspect of the present invention, an electronic power source voltage regulator includes: an input port having a first input end and a second input end, an output port having a first output end and a second output end, wherein the second output end is electrically connected to the second input end so as to provide an output voltage, a switch set electrically connected between the input port and an AC power source, a capacitor having a first end electrically connected to the first input end and a second end electrically connected to the first output end, an inductor having a first end electrically connected to the first input end, and an electrical energy converter including an electrical energy storage device, a first output terminal, and a second output terminal, wherein the first output terminal is electrically connected to a second end of the inductor, the second output terminal is electrically connected to the first output end, and the energy converter transfers an electrical energy of the storage device into the output voltage to be output so as to stabilize the output voltage when a significant voltage difference of the AC power source occurs.

Preferably, the switch set further comprises: a first connecting configuration, wherein the first input and second input ends are directly and electrically connected to the AC power source when the voltage value of the AC power source is within a pre-determined range, and a second connecting configuration, wherein the first and second input ends are directly and electrically connected to each other when the voltage value of the AC power source is out of the pre-determined range.

Preferably, the electrical energy storage device is a battery.

Preferably, the electrical energy converter further comprises an inverter.

Preferably, the AC power source is a commercial power source.

Preferably, the switch set further comprises: a first connecting configuration, wherein the first and second input ends are directly and electrically connected to the AC power source when a frequency variation amount of the AC power source is within a pre-determined range, and a second connecting configuration, wherein the first and second input ends are directly and electrically connected to each other when the frequency variation amount of the AC power source is out of the pre-determined range.

According to another aspect of the present invention, an electronic power source voltage regulator includes: an input port having a first input end and a second input end, an output port having a first output end and a second output end, wherein the second output end is electrically connected to the second input end so as to provide an output voltage, a switch set electrically connected between the input port and an AC power source, a capacitor having a first end electrically connected to the first input end and a second end electrically connected to the first output end, an inductor having a first end electrically connected to the first input end, and an electrical energy converter including an electrical energy storage device, a first output terminal, and a second output terminal, wherein the first output terminal is electrically connected to a second end of the inductor, the second output terminal is electrically connected to the first output end, and the energy converter transfers an electrical energy of the storage device into the output voltage to be output so as to stabilize the output voltage when a significant voltage difference of the output voltage occurs.

Preferably, the switch set further comprises: a first connecting configuration, wherein the first input and second input ends are directly and electrically connected to the AC power source when a voltage value of the AC power source is within a pre-determined range, and a second connecting configuration, wherein the first and second input ends are directly and electrically connected to each other when the voltage value of the AC power source is out of the predetermined range.

Preferably, the electrical energy storage device is a battery.

Preferably, the electrical energy converter further comprises an inverter.

Preferably, the AC power source is a commercial power source.

Preferably, the switch set further comprises: a first connecting configuration, wherein the first and second input ends are directly and electrically connected to the AC power source when a frequency variation amount of the AC power source is within a pre-determined range, and a second connecting configuration, wherein the first and second input ends are directly and electrically connected to each other when the frequency variation amount of the AC power source is out of the pre-determined range.

The present invention may best be understood through the following descriptions with reference to the accompanying drawings, in which:

DETAILED DESCRIPTION OF THE PREFERRED EMBODIMENT

Figure 1A:
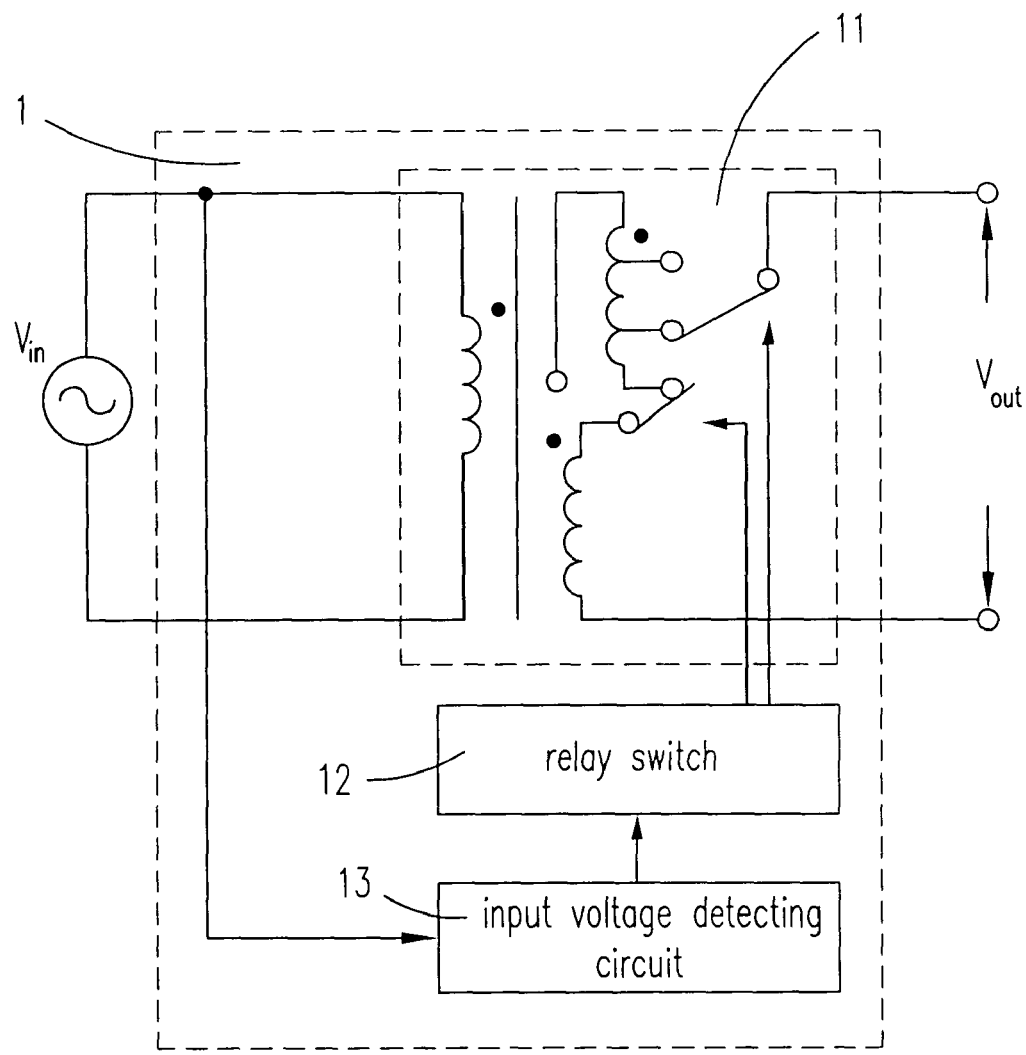
FIG. 1(a) is the block diagram of the isolated mechanical power source voltage regulator of the prior art.
Figure 1B:
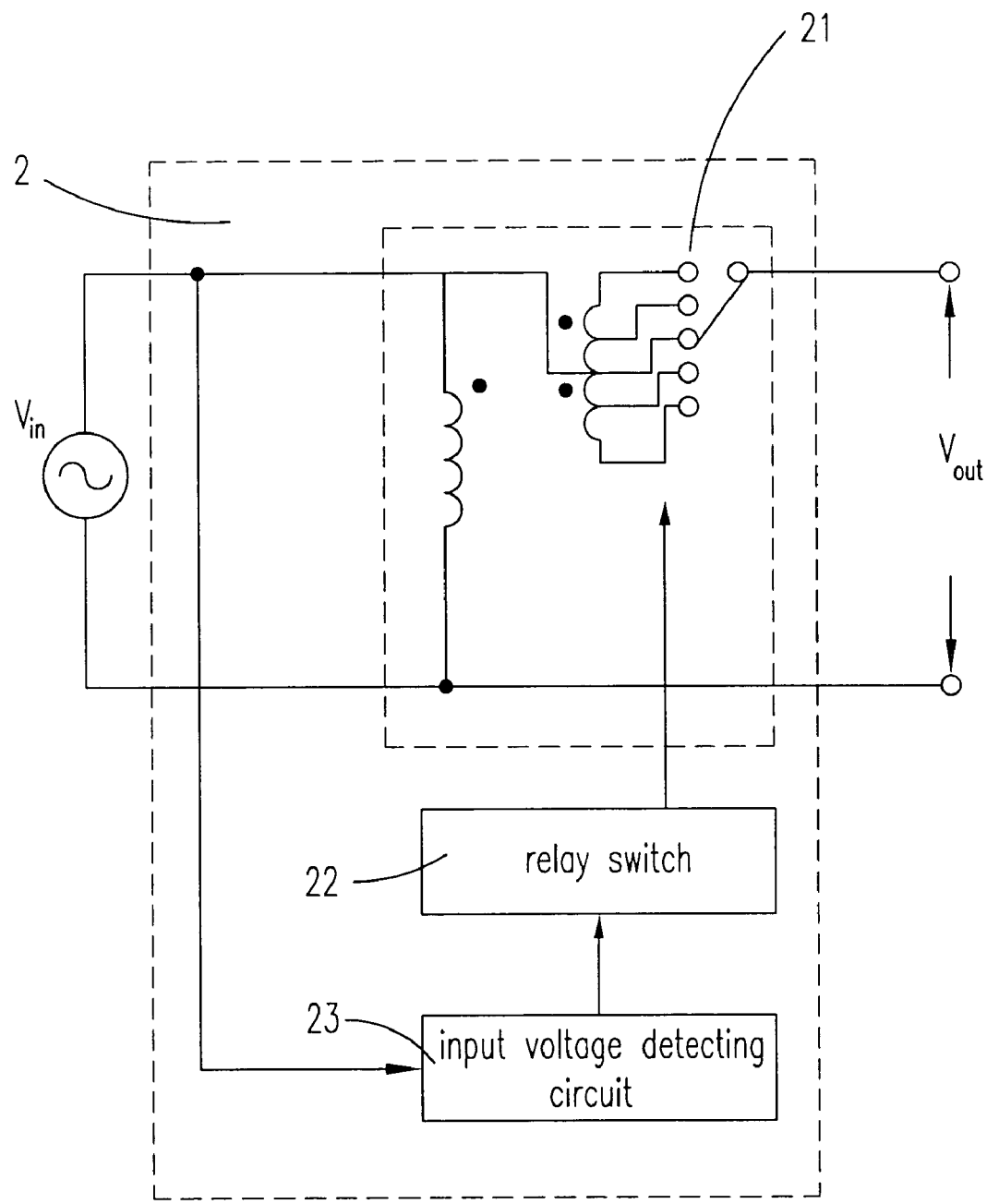
FIG. 1(b) is the block diagram of the non-isolated mechanical power source voltage regulator of the prior art.
Figure 2A:
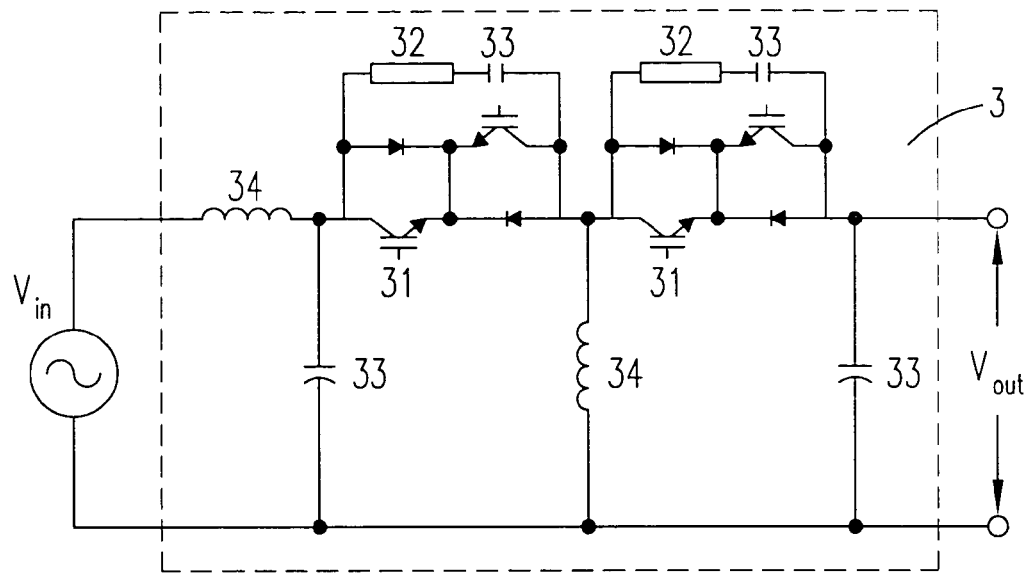
FIG. 2(a) is the schematic circuit diagram of the first electronic power source voltage regulator of the prior art.
Figure 2B:
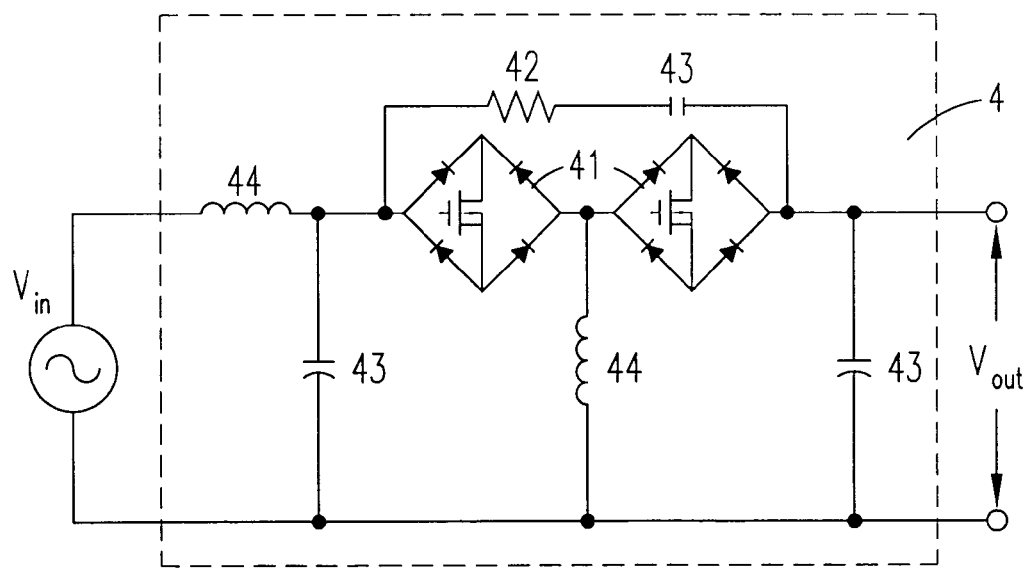
FIG. 2(b) is the schematic circuit diagram of the second electronic power source voltage regulator of the prior art.
Figure 3A:
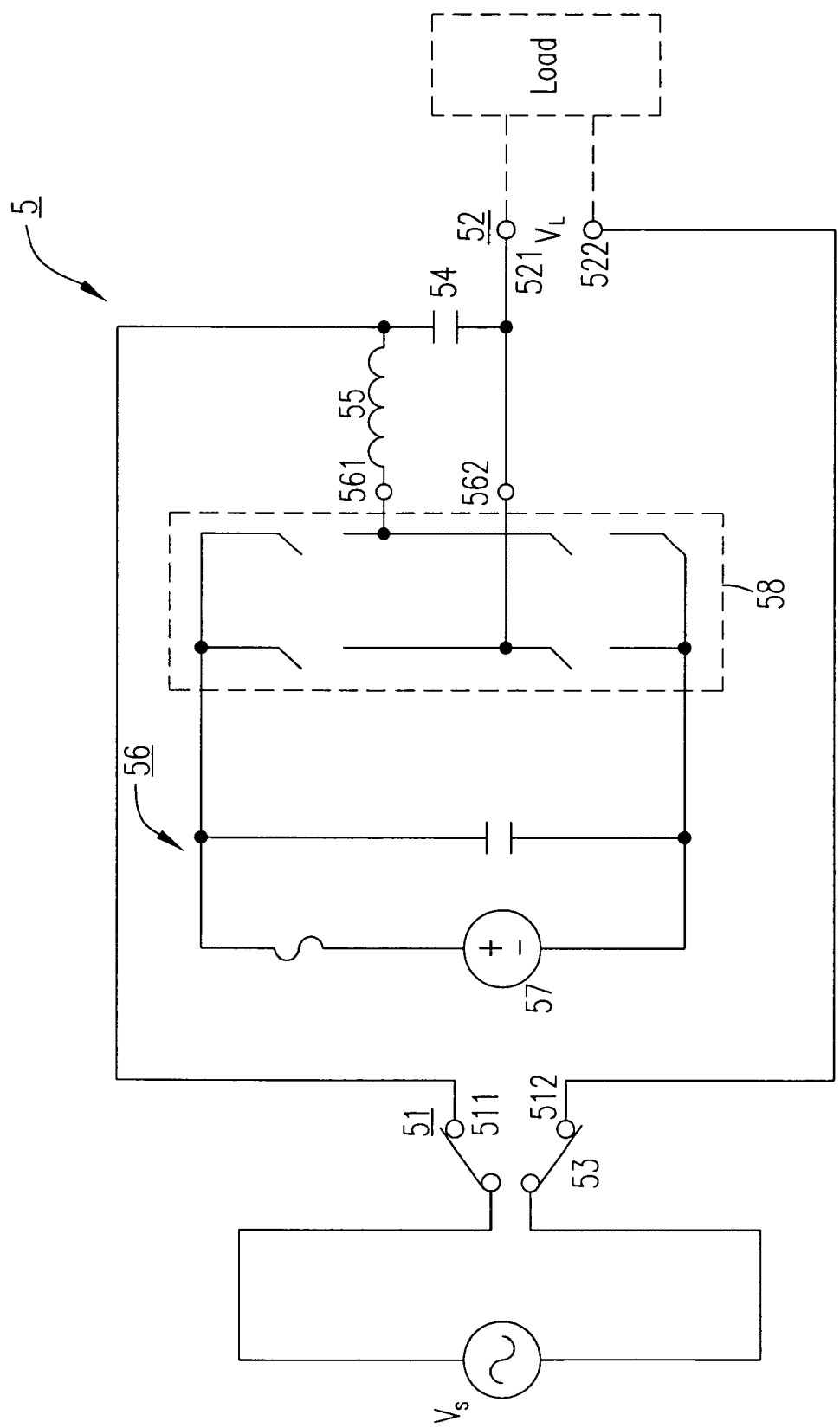
FIGS. 3(a) to 3(b) are the schematic circuit diagrams of the most preferred embodiment of the present invention.
Figure 3B:
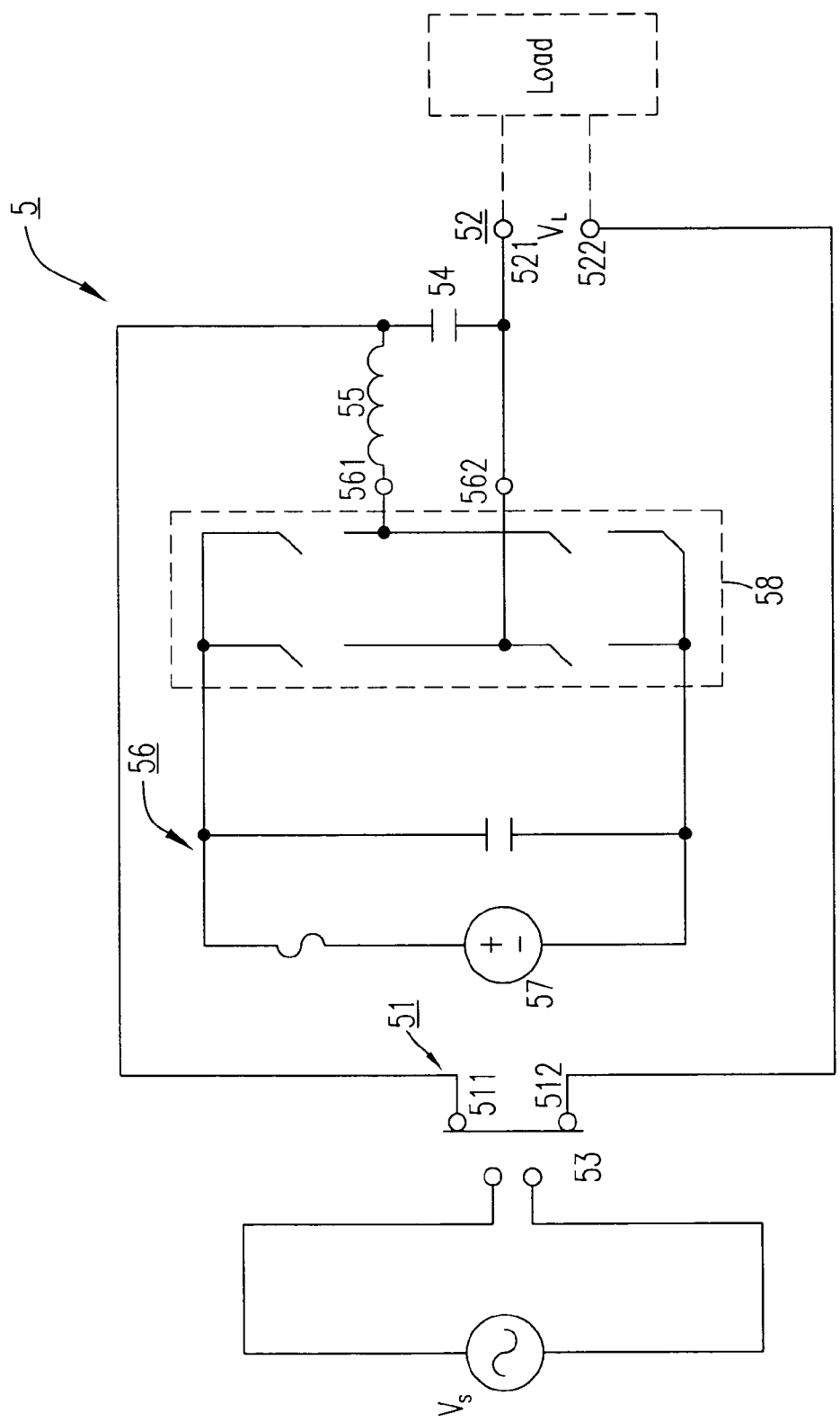

Please refer to FIGS. 3(a) to 3(b), which are the schematic circuit diagrams of the most preferred embodiment of the electronic power source voltage regulator of the present invention. As shown in FIGS. 3(a) to 3(b), an electronic power source voltage regulator 5 includes: an input port 51, an output port 52, a switch set 53, a capacitor 54, an inductor 55, and an electrical energy converter 56. The input port 51 includes a first input end 511 and a second input end 512. The output port 52 includes a first output end 521 and a second output end 522, in which the second output end 522 of the output port 52 is connected to the second input end 512 of the input port 51 to provide an output voltage $V_L$. The switch set 53 is electrically connected between the input port 51 and an AC power source $V_S$. The first end of the capacitor 54 is electrically connected to the first input end 511 of the input port 51, and the second end of the capacitor 54 is electrically connected to the first output end 521 of the output port 52. The first end of the inductor 55 is electrically connected to the first input end 511 of the input port 51. The electrical energy converter 56 includes an electrical energy storage device 57, a first output terminal 561, and a second output terminal 562. The first output terminal 561 is electrically connected to the second end of the inductor 55, and the second output terminal 562 is electrically connected to the first output end 521 of the output port 52. When a significant voltage difference of the AC power source $V_S$ occurs, the electrical energy converter 56 transfers the electrical energy of the electrical storage device 57 into the output voltage $V_L$ to be output so as to stabilize the output voltage $V_L$.

In which, the switch set 53 further comprises a first connecting configuration and a second connecting configuration. The first connecting configuration is that the first input and second input ends 511 and 512 of the input port 51 are directly and electrically connected to the AC power source $V_S$ when a voltage value and the frequency variation amount of the AC power source are within a pre-determined range. The second connecting configuration is that the first and second input ends 511 and 512 are directly and electrically connected to each other when the voltage value and the frequency variation amount of the AC power source $V_S$ are out of the pre-determined range.

The electrical energy storage device 57 can be a battery. The electrical energy converter 56 further includes an inverter 58. The AC power source $V_S$ can be a commercial power source.

The working principles of the electronic power source voltage regulator of the present invention are described as follows. When a voltage of the AC power source $V_S$ is within a pre-determined range, the first input and second input ends 511 and 512 of the input port 51 are directly and electrically connected to the AC power source $V_S$ as shown in FIG. 3(a). When a voltage sag of the AC power source $V_S$ occurs, the electrical energy converter 56 is employed to transfer the electrical energy of electrical energy storage device 57 into the output voltage $V_L$ to be output so as to compensate the insufficient of the AC power source $V_S$. If the AC power source $V_S$ is out of a pre-determined range, the first and second input ends 511 and 512 of the input port 51 are directly and electrically connected to each other. Then, the output voltage is provided by the electrical energy converter 56, which transfers the electrical energy of electrical energy storage device 57 into the output voltage $V_L$ to be output, so as to maintain the output voltage, $V_L$, at a constant value.

Figure 4A:
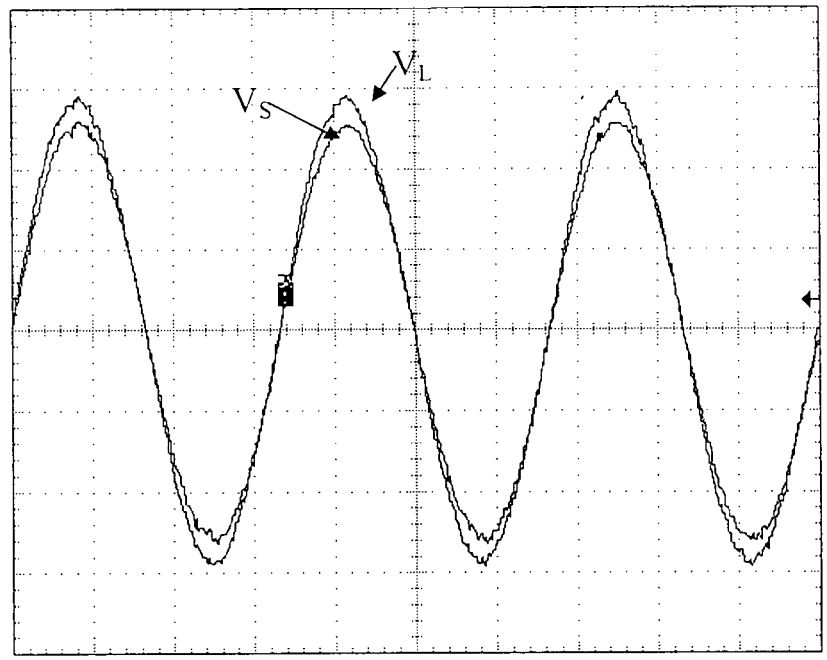
FIGS. 4(a) to 4(c) illustrate the waveforms of the AC power source voltage and the output voltage when the most preferred embodiment of the electronic power source voltage regulator of the present invention is in the operations of the voltage regulating.
Figure 4B:
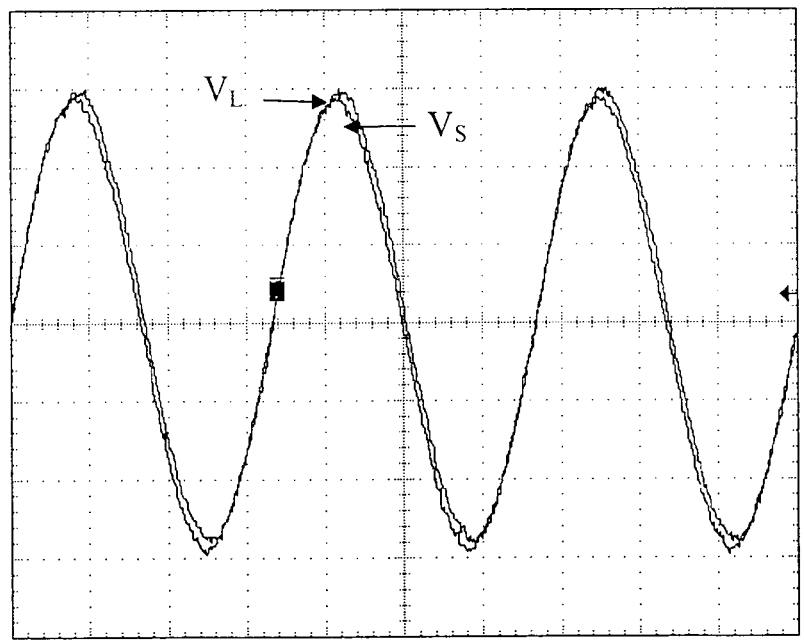
Figure 4C:
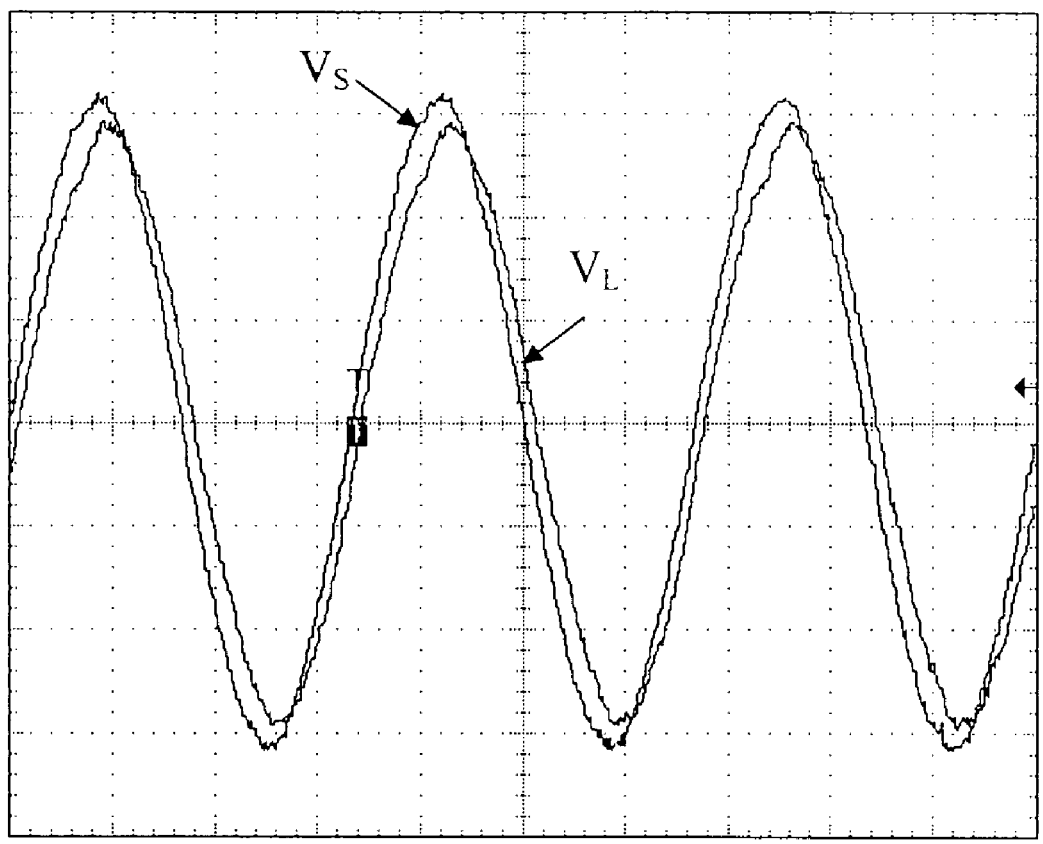

Please refer to FIGS. 4(a) to 4(c), which illustrate the waveforms of the AC power source voltage and the output voltage when the most preferred embodiment of the electronic power source voltage regulator of the present invention is in the operations of the voltage regulating.

FIG. 4(a) shows the waveforms of the AC power source voltage $V_S$ and the output voltage $V_L$ when the AC power source $V_S$ is with a lower than normal level of voltage. FIG. 4(b) shows the waveforms of the AC power source voltage $V_S$ and the output voltage $V_L$ when the AC power source $V_S$ is with a normal level of voltage. FIG. 4(c) shows the waveforms of the AC power source voltage $V_S$ and the output voltage $V_L$ when the AC power source is with a higher than normal level of voltage. From the real testing waveforms of the proposed electric voltage regulator in FIG. 4, one can tell that the disclosed technique could actually provides the controlling functions of maintaining the precisely constant voltage of output.

Figure 5A:
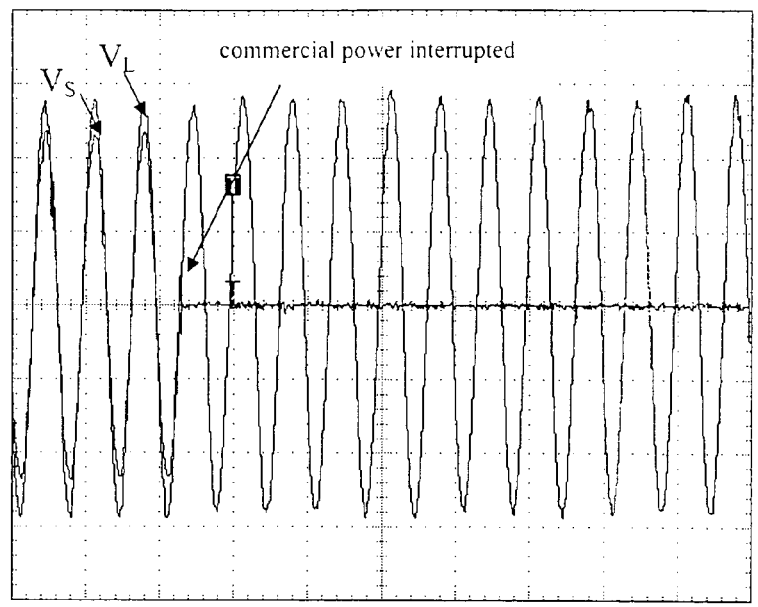
FIGS. 5(a) to (b) illustrate the waveforms of the AC power source voltage and the output voltage when the most preferred embodiment of the electronic power source voltage regulator of the present invention is in the operations of the redundant power source.
Figure 5B:
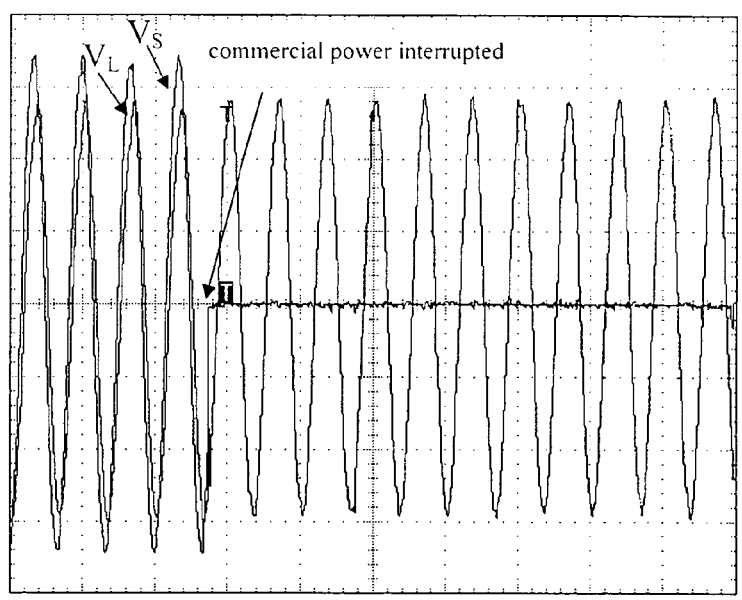

Please refer to FIGS. 5(a) to 5(b), which illustrate the waveforms of the AC power source voltage and the output voltage when the most preferred embodiment of the electronic power source voltage regulator of the present invention is in the operations of the redundant power source.

FIG. 5(a) shows the waveforms of the AC power source voltage $V_S$ and the output voltage $V_L$ when the AC power source $V_S$ is with a lower than normal level of voltage and then interrupted. FIG. 5(b) shows the waveforms of the AC power source voltage $V_S$ and the output voltage $V_L$ when the AC power source is with a higher than normal level of voltage and then interrupted. From FIG. 5, one can tell that a battery adding inside the proposed electronic power source voltage regulator can be used as a redundant power source when the commercial power source is with a significant voltage difference.

In conclusion, the present invention can provide a electronic power source voltage regulator with the following advantages:

(1) Employing the commercial power source in series to compensate the voltage so as to achieve the purpose of voltage regulating, the power at the provided electronic power source voltage regulator is decreased thus the heat-loss problem of the electronic power source voltage regulator can be improved dramatically;

(2) Controlling the output voltage at a constant value, thus the voltage regulating efficiency as a whole can be strengthened;

(3) Providing a DC-link connecting route inside the proposed electronic power source voltage regulator, a battery can be added inside the proposed voltage regulator, thus the proposed voltage regulator can be used as a redundant power source when the commercial power source has a significant voltage difference.

Although the present invention has been described and illustrated in an example of the most preferred embodiment, however, the constructional characteristics of the present invention are not limited by that. The variations and modifications that anyone who is familiar with the skill can think of easily which fall within the spirit and scope of the present invention as defined by the appended claims should be included.

What is claimed is:

1. An electronic power source voltage regulator, comprising:
   an input port having a first input end and a second input end;
   an output port having a first output end and a second output end, wherein said second output end is electrically connected to said second input end so as to provide an output voltage;
   a switch set electrically connected between said input port and an AC power source;
   a capacitor having a first end electrically connected to said first input end and a second end electrically connected to said first output end;
   an inductor having a first end electrically connected to said first input end; and
   an electrical energy converter comprising an electrical energy storage device, a first output terminal, and a second output terminal, wherein said first output terminal is electrically connected to a second end of said inductor, said second output terminal is electrically connected to said first output end, and said energy converter transfers an electrical energy of said storage device into said output voltage to be output so as to stabilize said output voltage when a significant voltage difference of said AC power source occurs,
   wherein said switch set further comprises a first connecting configuration, wherein said first input and second input ends are directly and electrically connected to said AC power source when a voltage value of said AC power source is within a pre-determined range; and a second connecting configuration, wherein said first and second input ends are directly and electrically connected to each other when said voltage value of said AC power source is out of said pre-determined range.

2. The voltage regulator according to claim 1, wherein said electrical energy storage device is a battery.

3. The voltage regulator according to claim 1, wherein said electrical energy converter further comprises an inverter.

4. The voltage regulator according to claim 1, wherein said AC power source is a commercial power source.

5. The voltage regulator according to claim 1, wherein said switch set further comprises:
   a first connecting configuration, wherein said first and second input ends are directly and electrically connected to said AC power source when a frequency variation amount of said AC power source is within a pre-determined range; and
   a second connecting configuration, wherein said first and second input ends are directly and electrically connected to each other when said frequency variation amount of said AC power source is out of said pre-determined range.

6. An electronic power source voltage regulator, comprising:
   an input port having a first input end and a second input end;

an output port having a first output end and a second output end, wherein said second output end is electrically connected to said second input end so as to provide an output voltage;

a switch set electrically connected between said input port and an AC power source;

a capacitor having a first end electrically connected to said first input end and a second end electrically connected to said first output end;

an inductor having a first end electrically connected to said first input end; and an electrical energy converter comprising an electrical energy storage device, a first output terminal, and a second output terminal, wherein said first output terminal is electrically connected to a second end of said inductor, said second output terminal is electrically connected to said first output end, and said energy converter transfers an electrical energy of said storage device into said output voltage to be output so as to stabilize said output voltage when a significant voltage difference of said output voltage occurs, wherein said switch set further comprises a first connecting configuration, wherein said first input and second input ends are directly and electrically connected to said AC power source when a voltage value of said AC power source is within a pre-determined range; and a second connecting configuration, wherein said first and second input ends are directly and electrically connected to each other when said voltage value of said AC power source is out of said pre-determined range.

7. The voltage regulator according to claim 6 wherein said electrical energy storage device is a battery.

8. The voltage regulator according to claim 6, wherein said electrical energy converter further comprises an inverter.

9. The voltage regulator according to claim 6, wherein said AC power source is a commercial power source.

10. The voltage regulator according to claim 6, wherein said switch set further comprises:

a first connecting configuration, wherein said first and second input ends are directly and electrically connected to said AC power source when a frequency variation amount of said AC power source is within a pre-determined range; and a second connecting configuration, wherein said first and second input ends are directly and electrically connected to each other when said frequency variation amount of said AC power source is out of said pre-determined range.

* * * * *